(12) United States Patent
Cote et al.

(10) Patent No.: US 11,376,788 B2
(45) Date of Patent: Jul. 5, 2022

(54) APPARATUS FOR ADDITIVELY MANUFACTURING AN ARTICLE AND RELATED TOOLS

(71) Applicant: Northrop Grumman Systems Corporation, Falls Church, VA (US)

(72) Inventors: Thomas A. Cote, Ashburn, VA (US); Michael D. Roberts, Fairfax, VA (US); Randy L. Spicer, Sterling, VA (US); William A. Wautlet, Alexandria, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 119 days.

(21) Appl. No.: 16/575,952

(22) Filed: Sep. 19, 2019

(65) Prior Publication Data
US 2021/0086443 A1    Mar. 25, 2021

(51) Int. Cl.
| | |
|---|---|
| *B29C 64/209* | (2017.01) |
| *B29C 64/321* | (2017.01) |
| *B29C 64/118* | (2017.01) |
| *B29C 64/295* | (2017.01) |
| *B29C 64/371* | (2017.01) |
| *B33Y 10/00* | (2015.01) |
| *B33Y 30/00* | (2015.01) |
| *B33Y 40/00* | (2020.01) |

(52) U.S. Cl.
CPC .......... *B29C 64/209* (2017.08); *B29C 64/118* (2017.08); *B29C 64/295* (2017.08); *B29C 64/321* (2017.08); *B29C 64/371* (2017.08); *B33Y 10/00* (2014.12); *B33Y 30/00* (2014.12); *B33Y 40/00* (2014.12)

(58) Field of Classification Search
CPC ... B29C 64/209; B29C 64/321; B29C 64/118; B29C 64/371; B29C 64/295; B33Y 30/00
See application file for complete search history.

(56) References Cited

U.S. PATENT DOCUMENTS

| | | | |
|---|---|---|---|
| 2015/0147427 A1* | 5/2015 | Lundwall | B29C 67/0055 425/375 |
| 2016/0031159 A1* | 2/2016 | Church | B29C 64/106 264/308 |
| 2016/0067920 A1 | 3/2016 | Fontaine | |

(Continued)

FOREIGN PATENT DOCUMENTS

| | | |
|---|---|---|
| CN | 105584052 A | 5/2016 |
| CN | 207736759 U | 8/2018 |
| JP | 6454810 B1 | 1/2019 |

OTHER PUBLICATIONS

International Search Report for International Application No. PCT/US2020/051096, dated Feb. 24, 2021, 5 pages.

(Continued)

*Primary Examiner* — Joseph S Del Sole
*Assistant Examiner* — Mohamed K Ahmed Ali
(74) *Attorney, Agent, or Firm* — TraskBritt

(57) ABSTRACT

An apparatus for additively manufacturing an article comprises a heat block, a nozzle configured to receive a feed material in operable communication with the heat block, and a radiator configured to transfer heat from the heat block to an external environment by thermal radiation. Related tools for additively manufacturing a material in a vacuum, and related methods are also disclosed.

27 Claims, 9 Drawing Sheets

(56) References Cited

U.S. PATENT DOCUMENTS

2016/0236408 A1\* 8/2016 Wolf .................... B29C 64/209
2017/0036783 A1   2/2017 Snyder
2017/0057168 A1\* 3/2017 Miller .................. B29C 64/209
2017/0072632 A1   3/2017 Page et al.
2018/0178463 A1   6/2018 Manian

OTHER PUBLICATIONS

International Written Opinion for International Application No. PCT/US2020/051096, dated Feb. 24, 2021, 9 pages.

\* cited by examiner

APPARATUS FOR ADDITIVELY MANUFACTURING AN ARTICLE AND RELATED TOOLS

STATEMENT REGARDING FEDERALLY SPONSORED RESEARCH OR DEVELOPMENT

This invention was made with government support under Contract Number NRO000-14-C-0133 awarded by the National Reconnaissance Office. The government has certain rights in the invention.

TECHNICAL FIELD

Embodiments of the disclosure relate generally to additive manufacturing tools configured for additively manufacturing one or more articles in low pressure environments, such as in a vacuum. More particularly, embodiments of the disclosure relate to additive manufacturing tools including a radiator for transferring heat from a hotend of the additive manufacturing tool by thermal radiation, and to related methods of fabricating an article with the additive manufacturing tool.

BACKGROUND

Additive manufacturing processes may include sequentially bonding materials together to form a completed article. The article may be formed layer by layer using computer numeric controlled methods to deposit each layer on previously formed layers. Additive manufacturing processes may include, for example, stereolithographic processes, powder bed fusion (PBF) processes such as selective laser sintering (SLS), binder jetting, material extrusion (e.g., fused filament fabrication (FFF), directed energy deposition (DED) such as laser metal deposition (LMD), among other processes.

Temperature control of the additive manufacturing tool and feed materials is of importance throughout the additive manufacturing process. Many additive manufacturing processes require heating the feed materials to be added to the article being formed at high temperatures (e.g., above a melting temperature of the feed material) and depositing the feed material through a nozzle and onto a surface of the article being formed. Additive manufacturing tools require a rapid transition from the high temperatures of the feed materials at the nozzle to lower temperatures at locations away from the nozzle. If heat from the nozzle creeps into other portions of the additive manufacturing tool, the feed material being fed to the nozzle may buckle, causing the tool to seize. Accordingly, conventional additive manufacturing tools include a fan to convectively cool various components of the tool with air. In such tools, the air is directed toward various components of the additive manufacturing tool located away from the nozzle to control the temperature profile of the additive manufacturing tool.

BRIEF SUMMARY

Embodiments disclosed herein include tools for additive manufacturing an article and to related methods of forming the article using the tool. For example, in accordance with one embodiment, an apparatus for additively manufacturing an article comprises a heat block, a nozzle configured to receive a feed material in operable communication with the heat block, and a radiator configured to transfer heat from the heat block to an external environment by thermal radiation.

In additional embodiments, a tool for additively manufacturing a material in a vacuum comprises an extrusion head configured to be in operable communication with a feed material. The extrusion head comprises a nozzle configured to receive the feed material, a heat block coupled to the nozzle, a heat break coupled to the heat block, and a radiator adjacent to the heat break and spaced from the heat block by the heat break.

In further embodiments, a method of additively manufacturing in a vacuum comprises heating a feed material proximate a nozzle with a heat block, transferring heat from the heat block to a heat break adjacent to the heat block, and transferring heat from the heat break via thermal radiation with a radiator located adjacent to the heat break during dispensing of the feed material from the nozzle.

DETAILED DESCRIPTION

Figure 1:
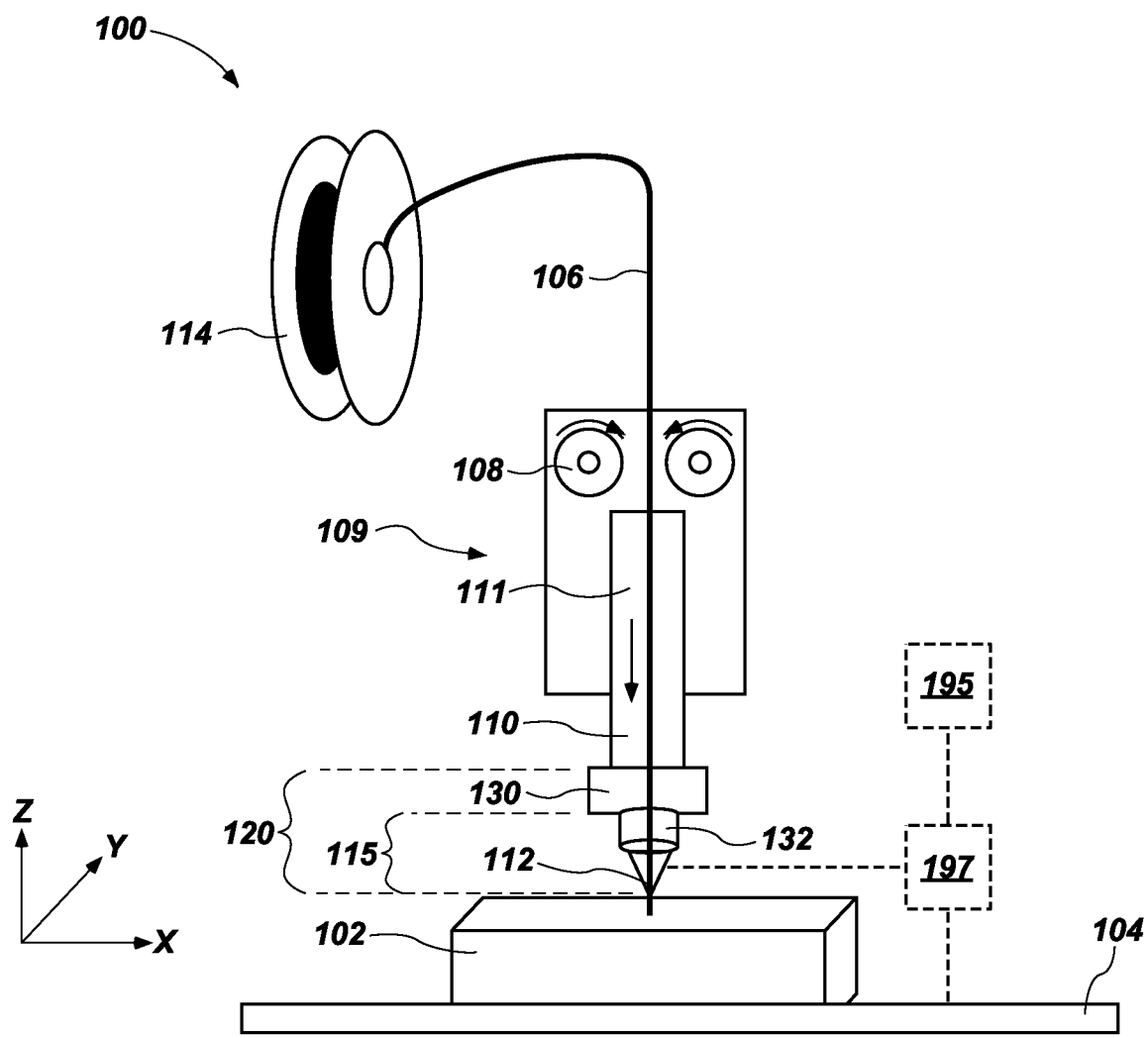
FIG. 1 is a simplified schematic of a tool for forming one or more articles, in accordance with embodiments of the disclosure.

Illustrations presented herein are not meant to be actual views of any particular material, component, or system, but are merely idealized representations that are employed to describe embodiments of the disclosure. Additionally, elements common between figures may retain the same numerical designation for convenience and clarity.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for forming an article by additive manufacturing. Only those process acts and structures necessary to understand the embodiments of the disclosure are described in detail below. Additional acts or materials to form an article by additive manufacturing may be performed by conventional techniques.

As used herein, the term "layer" is used to reference manufacturing techniques according to embodiments of the disclosure and is to be taken in a broad sense to reference a material or materials deposited or formed at a particular level, or elevation, above a reference plane and not to require that such material or materials form a continuous, unbroken layer or level of material, or that such material or materials deposited at a particular elevation are necessarily of uniform thickness or height. In other words, a "layer" may comprise a discontinuous mass of a material or materials deposited at a particular level, and of a non-uniform thickness or height at such level.

As used herein, the term "vacuum" means and includes a volume having a pressure less than atmospheric pressure, such as a pressure between about 0 kPa and about 101.3 kPa. An absolute vacuum may be substantially devoid of matter. However, as used herein, the term "vacuum" also encompasses so-called "hard vacuums," "soft vacuums," and partial vacuums which may include some matter and may exhibit a pressure greater than 0 kPA, as may be encountered in space.

According to embodiments disclosed herein, an additive manufacturing tool may be used to fabricate an article by additive manufacturing in a low pressure environment, such as in a vacuum, in low gravity (e.g., microgravity conditions) or zero gravity, in a high pressure environment, or in other environments. As only one example, low pressure environments may be encountered in space (e.g., outside of the Earth's atmosphere, such as on the moon, for example). Accordingly, the additive manufacturing tool may be configured for use outside of the Earth's atmosphere.

The additive manufacturing tool may include an extrusion head comprising a nozzle through which a feed material is directed onto a part being additively manufactured. The extrusion head may also include a hotend comprising a heat block configured to heat the feed material to a suitable temperature prior to introducing the feed material to the nozzle. The extrusion head may further comprise a radiator sized, shaped, and configured to reduce or substantially prevent heat creep from the heat block to other portions of the extrusion head and the tool (e.g., an extruder, rollers, feed guide, feed material, etc.) located away from the nozzle and the heat block. The radiator may extract heat from the heat block by conductive thermal transfer and may itself be cooled by thermal radiation (radiative cooling). The radiator may include at least one surface in direct physical contact with a heat break, which in turn may include at least one surface in direct physical contact with the radiator. The radiator may be configured to transfer heat from the heat block (through the heat break) at least partially by conduction. The radiator may further include other surfaces configured to transfer heat away from (out of) the radiator by thermal radiation. In some embodiments, the radiator is physically isolated (does not physically contact) the heat block. The heat break may be located between the heat block and the radiator and may be configured to thermally isolate the heat block from other portions of the extrusion head. The properties (e.g., thermal conductivity, absorptivity, emissivity, thermal resistance, etc.) of the radiator, heat block, heat break, and other components of the extrusion head may be selected to provide a suitable thermal gradient between the heat block and the extruder. In some embodiments, a temperature difference between the heat block and a portion of the extrusion head located in a direction toward the feed material source may be greater than about 140° C.

Accordingly, the additive manufacturing tool may be configured to remove heat from at least a portion of the extrusion head by thermal radiation without, for example, convective air cooling or by other cooling means, such as liquid cooling. In some embodiments, the additive manufacturing tool may be used in low gravity (e.g., microgravity) or zero gravity environments, low pressure environments, such as in a vacuum, high pressure environments, or other environments. The additive manufacturing tool may be used to additively manufacture one or more articles in outer space, where there is insufficient air to convectively cool the extrusion head at locations distal from the nozzle and heat block. By way of nonlimiting example, the additive manufacturing tool may be used to fabricate components for satellite structures (e.g., satellite frame structures, a truss structure, etc.), components for aerospace structures (e.g., space shuttles, rockets, satellites, missiles, etc.), components for aircraft structures (e.g., airplanes, helicopters, etc.), military vehicle structures, or other structures. In some embodiments, the tool may be used to repair or fabricate replacement parts for one or more existing structures located in space.

FIG. 1 is a simplified schematic of a tool 100 for forming one or more articles, in accordance with embodiments of the disclosure. The tool 100 may be configured to additively manufacture an article 102. The tool 100 may be configured to manufacture the article 102 in low gravity environments, microgravity environments, low pressure environments (such as in a vacuum), high pressure environments, or other environments. In some embodiments, the tool 100 is configured to additively manufacture the article 102 in conditions that may be encountered in space. In some embodiments, the tool 100 is configured to additively manufacture the article 102 in vacuum conditions in which convective heat transfer means (such as air cooling with a fan) is infeasible (e.g., due to a lack of air to be used for heat transfer).

The tool 100 may be referred to herein for the sake of simplicity as a 3D printer and may be configured to form the article 102 one layer at a time. In some embodiments, the tool 100 may comprise, for example, a fused deposition modeling tool, a fused filament fabrication (FFF) tool, a selective laser sintering (SLS) tool, a direct metal laser sintering tool, or another tool configured for additively manufacturing the article 102. In some embodiments, the tool 100 comprises a fused filament fabrication tool.

The tool 100 may include a table (e.g., a platen) 104 on which the article 102 to be manufactured with the tool 100 is disposed. The tool 100 may include an extrusion head 120 and a feed apparatus 109. The extrusion head 120 may include a radiator 130 and a so-called "hotend" 115 which may include, among other things, a heat block 132 and a nozzle 112. The hotend 115 may be configured to heat a feed material 106 (e.g., a filament) that is fed to the nozzle 112 through the feed apparatus 109 and the extrusion head 120.

The feed apparatus 109 may include an extruder 110 and rollers 108 (e.g., drive wheels), which may be configured to advance the feed material 106 from a feed source, such as from a spool 114. A feed guide (e.g., a filament guide) 111 may be configured to guide the feed material 106 from the spool 114 through the extrusion head 120 and to the nozzle 112. The nozzle 112 may be in operable communication with the extruder 110, which may be configured to provide the feed material 106 from the spool 114 to the nozzle 112. The nozzle 112 may be configured to deliver thin beads of the feed material 106 to the upper surface of the article 102.

Although FIG. 1 illustrates that the tool 100 includes only one spool 114, the disclosure is not so limited. In other embodiments, the tool 100 may include more than one spool 114, each spool 114 comprising a feed material 106 having a different composition, a different thickness (e.g., diameter), or both than the feed material 106 of other spools 114. For example, the tool 100 may include two, three, four, five, six, seven, eight, etc., types of feed materials 106 and associated spools 114, extrusion heads 120, and nozzles 112. In addition, although FIG. 1 illustrates that the tool 100 comprises only one teed apparatus 109 and associated hotend 115, the disclosure is not so limited. In other embodiments, the tool 100 may include a plurality of feed apparatuses 109 and associated hotends 115.

The feed material 106 may comprise at least one of a thermoplastic material, a thermosetting material, a thermopolymer, a thermosetting plastic, a metal, another material. By way of nonlimiting example, the feed material 106 may comprise at least one of acrylonitrile butadiene styrene (ABS), polyacetic acid (PLA), polyethylene terephthalate glycol (PETG), polylactic acid, high-impact polystyrene (HIPS), thermoplastic polyurethane (TPU), aliphatic polyamides (nylon), polyether ether ketone (PEEK), another material, a polymeric material (e.g., an epoxy material; a thermoplastic polymer material, such as one or more of a polyethylene (PE) material, a polypropylene (PP) material, a polystyrene (PS) material, a polyvinyl chloride (PVC) material, a poly(methyl methacrylate) (PMMA) material, a polycarbonate (PC) material, a polyphenylene oxide (PPO) material, a polyetherketone (PEK) material, a polyetheretherketone (PEEK) material, a polyaryletherketone (PAEK) material, a polyetherketoneketone (PEKK) material, a polyetherketoneetherketoneketone (PEKEKK) material, a polyether sulfone (PES) material, a polyphenylene sulfide (PPS) material, a polyphenylsulfone (PPSU) material, a polyphenylene material, an aromatic polyamide (PA) material, and a polyamideimide (PAI) material, a thermoset plastic material, such as one or more of an epoxy, bismaleimide, a cyanate ester, polyimide (PI) material, a preceramic polymer, such as one or more of a polysiloxanes, polysilazane, polycarbosilane and polysilsesquioxane, a polyurethane (PU) material, a phenol-formaldehyde material, a urea-formaldehyde material, and a polyester material, a glass material, a carbon-containing material, a boron-containing material.

In some embodiments, the feed material 106 may include a metal. By way of nonlimiting example, the feed material 106 may include at least one of aluminum, an aluminum alloy (e.g., $AlSi_{10}Mg$, $AlSi_7Mg$, $AlSi_{12}$, $AlSi_9Cu_3$, 6061 aluminum alloy (an alloy comprising between about 0.4 weight percent and about 0.81 weight percent silicon, up to about 0.7 weight percent iron, between about 0.15 weight percent and about 0.4 weight percent copper, up to about 0.15 weight percent manganese, between about 0.8 weight percent and about 1.2 weight percent magnesium, between about 0.04 weight percent and about 0.35 weight percent chromium, up to about 0.25 weight percent zinc, up to about 0.15 weight percent titanium, and between about 95.85 weight percent and about 98.56 weight percent aluminum), 7075 aluminum alloy (an alloy including between about 5.6 weight percent and about 6.1 weight percent zinc, between about 2.1 weight percent and about 2.5 weight percent magnesium, between about 1.2 weight percent and about 1.6 weight percent copper, less than 0.5 weight percent of each of silicon, iron, magnesium, titanium, and chromium, the remaining portion comprising aluminum), 7050 (an alloy including about 89 weight percent aluminum, about 2.3 weight percent copper, about 2.3 weight percent magnesium, about 6.2 weight percent zinc, and about 0.12 weight percent zirconium)), steel (e.g., 420 stainless steel, 300 series stainless steel, H13 too steel (an alloy including about 0.40 weight percent carbon, about 0.40 weight percent manganese, about 1.0 weight percent silicon, about 5.25 weight percent chromium, about 1.35 weight percent molybdenum, and about 1.0 weight percent vanadium), D2 tool steel (an alloy including about 1.50 weight percent carbon, about 0.30 weight percent manganese, about 0.30 weight percent silicon, about 12.00 weight percent chromium, about 0.75 weight percent molybdenum, and about 0.90 weight percent vanadium), A2 tool steel (an alloy including about 1.00 weight percent carbon, about 0.75 weight percent manganese, about 0.30 weight percent silicon, about 5.0 weight percent chromium, about 1.0 weight percent molybdenum, and about 0.25 weight percent vanadium), S7 shock-resisting tool steel (an alloy including about 0.50 weight percent carbon, about 0.75 weight percent manganese, about 0.25 weight percent silicon, about 3.25 weight percent chromium, and about 1.40 weight percent molybdenum)), stainless steel (17-4PH stainless steel (an alloy including between about 15.0 weight percent and about 17.5 weight percent chromium, between about 3.0 weight percent and about 5.0 weight percent nickel, between about 3.0 weight percent and about 5.0 weight percent copper, about 0.07 weight percent carbon, about 1.0 weight percent manganese, about 0.04 weight percent phosphorus, about 0.03 weight percent sulfur, about 1.0 weight percent silicon, between about 0.15 weight percent and about 0.45 weight percent combined of niobium and tantalum, the remainder comprising iron), 15-5PH (an alloy comprising between about 14.0 weight percent and about 15.5 weight percent chromium, between about 2.5 weight percent and about 4.5 weight percent copper, up to about 0.07 weight percent carbon, up to about 1.00 weight percent silicon, up to about 0.03 weight percent sulfur, between about 3.5 weight percent and about 5.5 weight percent nickel, up to about 1.0 weight percent manganese, up to about 0.04 weight percent phosphorus, and between about 0.15 weight percent and about 0.45 weight percent combined of niobium and tantalum), 316L stainless steel, 304L stainless steel, 310S stainless steel, 430 stainless steel, 430L stainless steel, 434 stainless steel, 410 stainless steel, 440 stainless steel, 630 stainless steel, etc.), titanium, a titanium alloy (e.g., $Ti_6Al_4V$, $TiAL_6Nb_7$, etc.), Inconel (718, 625, 713, 738, etc.), or a cobalt-chromium alloy.

In some embodiments, the feed material 106 may include one or more additive materials. By way of nonlimiting example, the additives may include one or more of nanotubes (e.g., carbon nanotubes (CNTs) (e.g., single wall carbon nanotubes (SWCNTs), multi-walled carbon nanotubes (MWCNTs)), tungsten sulfide ($WS_2$) nanotubes, molybdenum sulfide ($MoS_2$) nanotubes, tin sulfide ($SnS_2$) nanotubes, titanium dioxide ($TiO_2$) nanotubes, zirconium dioxide ($ZrO_2$) nanotubes, zinc oxide (ZnO) nanotubes, carbon nitride nanotubes, aluminum nanotubes, etc.), carbon black, a glass-containing material (e.g., glass fibers (e.g., fibers of silicon dioxide)), carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, etc.), other fibers, silicon carbide particles, particles (e.g., nanoparticles) of one or more of nickel, iron, cobalt, iron, carbon, silicon, etc.), nanostrands (e.g., nanostrands of one or more of nickel, iron, cobalt, iron, carbon, silicon, etc.).

The concentration of the additives in the matrix may be between about 0.1 weight percent and about 80.0 weight percent, such as between about 0.1 weight percent and about 0.5 weight percent, between about 0.5 weight percent and about 1.0 weight percent, between about 1.0 weight percent and about 2.0 weight percent, between about 2.0 weight percent and about 5.0 weight percent, between about 5.0 weight percent and about 10.0 weight percent, between about 10.0 weight percent and about 20.0 weight percent, between about 20.0 weight percent and about 30.0 weight percent, between about 30.0 weight percent and about 40.0 weight percent, between about 40.0 weight percent and about 60.0 weight percent, or between about 60.0 weight percent and about 80.0 weight percent. In some embodiments, the concentration of the additives in the matrix may be between about 5.0 weight percent and about 15.0 weight percent. In some embodiments, the concentration of the additives in the matrix may affect the structural and the electrical properties of the article 102.

Although the feed material 106 has been described as including various materials and additives, the disclosure is not limited by the composition of the feed material 106. In other words, the feed material 106 may comprise materials other than, and in addition to, those described above.

Although the tool 100 has been illustrated as comprising a spool 114 of the feed material 106, the disclosure is not so limited. In other embodiments, the tool 100 comprises one or more hoppers in operable communication with each of the extrusion head 120. Pellets comprising the teed material 106 material may be disposed in the hopper associated with the extrusion head 120. The pellets may be fed to an associated extrusion head 120 and disposed on the article 102 through a respective nozzle 112. Each hopper may include pellets having a different composition than the pellets of the other hoppers.

The nozzle 112 and the associated extrusion head 120 may be configured to move in at least the x and y directions to deposit the feed material 106 having a desired composition on the upper surface of the article 102. In some embodiments, the table 104 may be configured to move in the x-direction and the y-direction. The feed material 106 may be deposited at desired locations on the upper surface of the article 102 and may harden upon deposition on the upper surface of the article 102.

After a current layer on the upper surface of the article 102 is formed, one or both of the article 102 and the extrusion head 120 may be moved relative to each other in the z-direction. For example, the table 104 may be configured to move in the z-direction. In other embodiments, the extrusion head 120 may be configured to move in the z-direction. In some embodiments, the table 104 may be configured to move in the z-direction a distance corresponding to a thickness of the previously formed layer of material of the article 102.

In some embodiments, the tool 100 may be in operable communication with a processor having associated therewith a memory including instructions configured to direct the feed apparatus 109 and nozzle 112 to locations where the feed material 106 should be provided to form the article 102 having a desired size and shape. By way of nonlimiting example, the memory may include data for formation of a desired structure in the form of a computer-aided-design (CAD) model or a computer-aided-manufacturing (CAM) model configured to direct the extrusion head 120, nozzle 112, and table 104.

As one example, a first controller 195 may be in operable communication with a second controller 197, that is, in turn, in operable communication with the tool 100 (e.g., one or more of the nozzle extrusion head 120, the nozzle 112, and the table 104). In some embodiments, the first controller 195 may be located, for example, at a location remote from the tool 100 while the second controller 197 (e.g., a slave controller) is located proximate the tool 100. As one example, the first controller 195 may be located on the Earth and the second controller 197 may be located outside of the Earth's atmosphere, such as in space. In some embodiments, the second controller 197 may be configured to receive instructions from the first controller 195 and provide such instructions to the tool 100. The tool 100 may include one or more sensors (e.g., temperature sensors, proximity sensors, imaging devices) for measuring, for example, the temperature of the article, the temperature of the hotend 115, the size and shape of the article 102, etc. Such sensors may be in operable communication with the second controller 197, which may provide information from the sensors to the first controller 195. Instructions provided by the first controller 195 to the tool 100 via the second controller 197 may incorporate the information provided by the sensors and the second controller 197.

Although the tool 100 has been described as being in operable communication with the first controller 195 and the second controller 197, in other embodiments, the tool 100 may not include the second controller 197 and may include, for example, only one controller 195.

In some embodiments, the tool 100 may include topology optimization (TO) software for optimizing a material layout within a given set of loads, boundary conditions, and constraints with the goal of maximizing the performance of the system. In some such embodiments, the processor may be configured to form an article 102 having desired properties and configuration based on inputs by a user (such as desired electrical properties, structural properties, etc.).

As will be described herein, the hotend 115 may be configured to heat the feed material 106 from a temperature that is below a melting temperature of the teed material 106 to a temperature of about or greater than the melting temperature of the feed material 106 as the feed material 106 is moved through the hot end 115 toward the nozzle 112. Heating the feed material 106 to at least the melting temperature thereof may facilitate flowing of the feed material 106 through the nozzle 112 during use and operation of the tool 100.

The radiator 130 may be configured to cool the feed material 106 and the extrusion head 120 at locations distal from the heat block 132 and may substantially prevent or reduce the likelihood of heat creeping into the extruder 110 or the feed apparatus 109 of the tool 100, which heating may cause the feed material 106 to buckle, ultimately leading to jamming of the hotend 115 and nozzle 112.

Figure 2A:
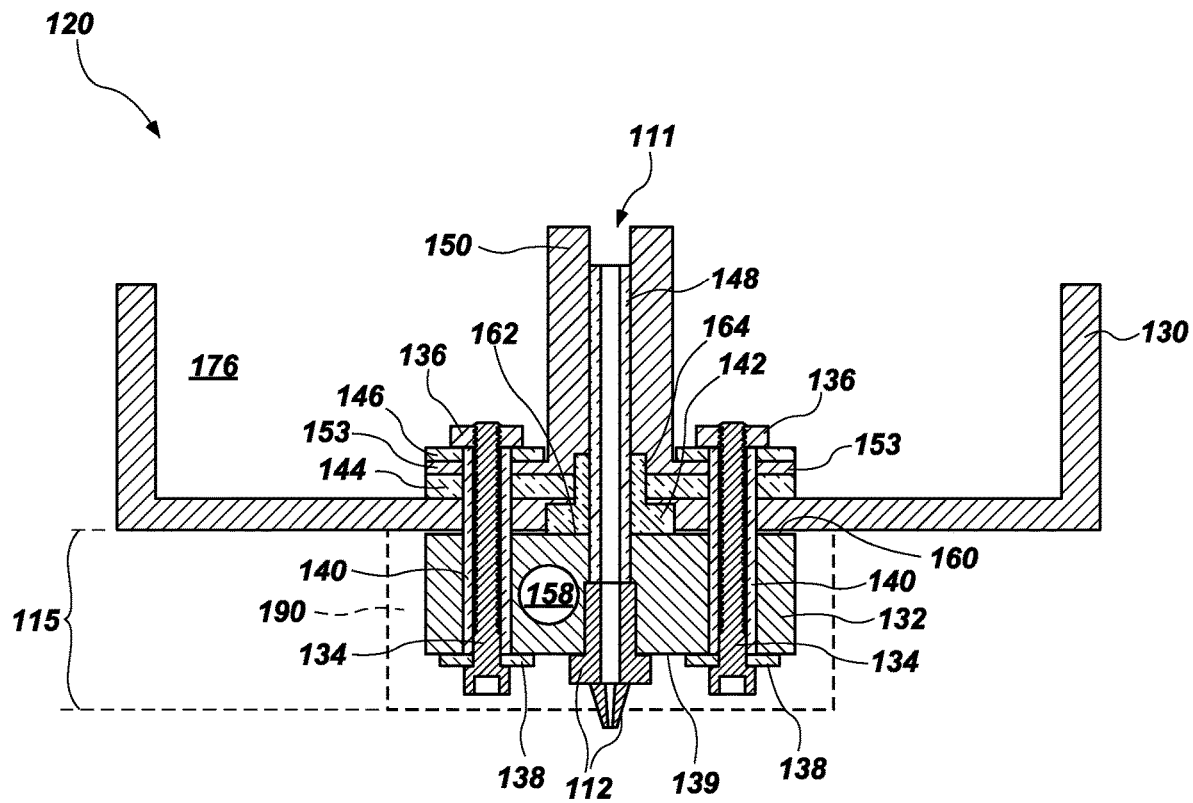
FIG. 2A is a simplified cross-sectional view of an extrusion head of the tool of FIG. 1, in accordance with embodiments of the disclosure.
Figure 2B:
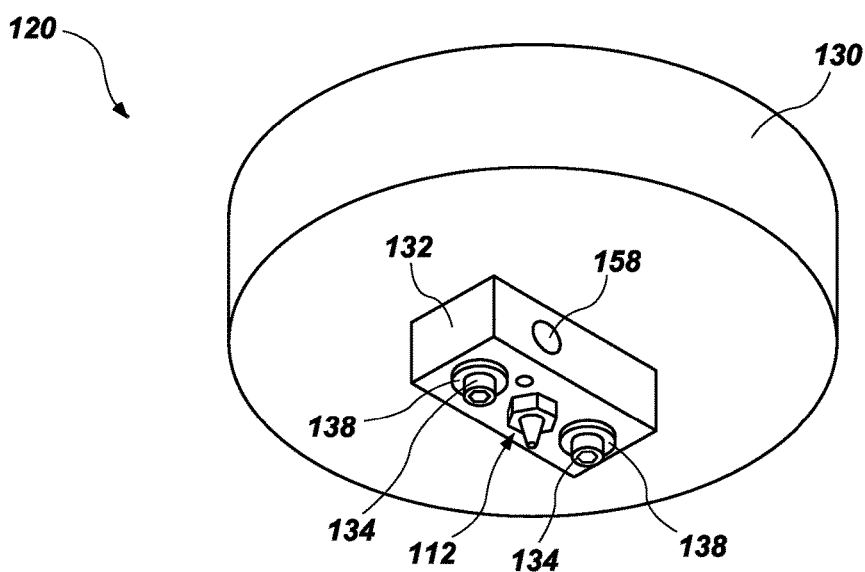
FIG. 2B is a simplified perspective view of the extrusion head of FIG. 2A.
Figure 3:
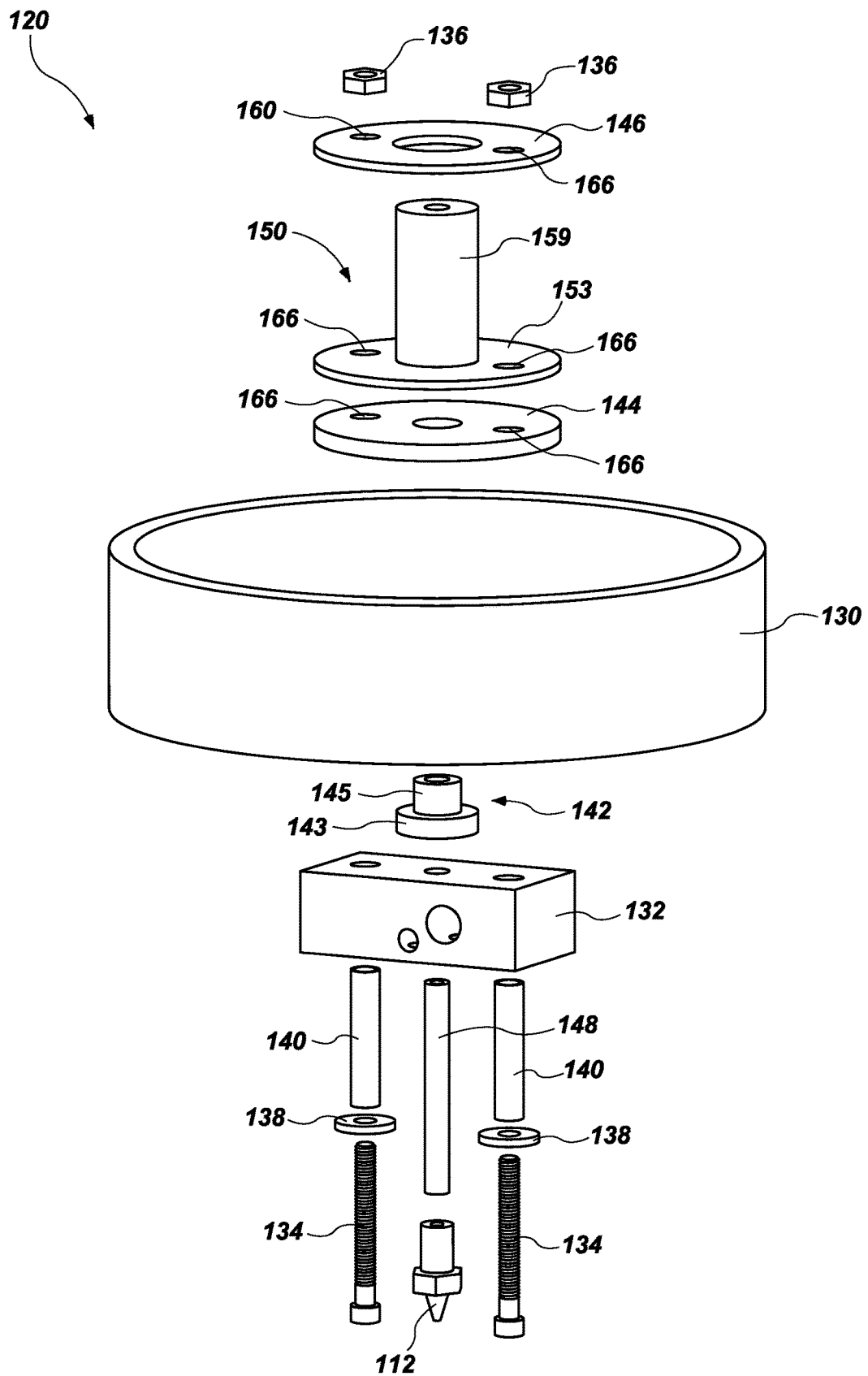
FIG. 3 is an exploded view of the extrusion head of FIG. 2A.

FIG. 2A is a simplified cross-sectional view of the extrusion head 120 of FIG. 1 and FIG. 2B is a simplified perspective view of the extrusion head 120. FIG. 3 is an exploded view of the extrusion head 120 of FIG. 2A. With reference to FIG. 2A and FIG. 2B, the extrusion head 120 includes the radiator 130 and the hotend 115. The hotend 115 includes the heat block 132 operably coupled to the radiator 130. The nozzle 112 is coupled to (e.g., threadably coupled to) the heat block 132 and is configured to provide the teed material 106 (FIG. 1) to the upper surface of the article 102

(FIG. 1) at a suitable temperature. The heat block 132 may be physically spaced from the radiator 130. For example, surface 160 of the heat block 132 may be spaced from an opposing surface of the radiator 130.

In use and operation, the feed material 106 (FIG. 1) is fed from the extruder 109 (FIG. 1) through an inside diameter of a thermal spacer 150 lined with a thermal liner 148. The thermal liner 148 and the thermal spacer 150 may thermally isolate the feed material 106 from the radiator 130 and the heat block 132. The feed material 106 may pass from the thermal spacer 150 through an opening within a heat break 142. The heat break 142 may be located between at least a portion of the radiator 130 and the heat block 132. The heat break 142 may thermally isolate the heat block 132 from the feed material 106 in the feed apparatus 109 (FIG. 1) and the extruder 110 (FIG. 1). The heat break 142 may also thermally isolate the radiator 130 from the heat block 132. After passing through the heat break 142, the feed material 106 is fed through an opening in the heat block 132 where the feed material 106 is heated to a temperature sufficient to melt the feed material 106. The heated feed material 106 passes through the nozzle 112 and is placed onto a surface of the article 102. (FIG. 1) being additively manufactured or onto a surface of the table 104 (such as at the beginning stages of fabrication of the article 102).

A first isolator 144, which may also be referred to as a first washer, may be located between the radiator 130 and the thermal spacer 150. The thermal spacer 150 may include a flange portion 153 located between the first isolator 144 and a second isolator 146, which may also be referred to as a second washer.

An insulative material 190 may be located around at least a portion of the hotend 115. The insulative material 190 may be located around, for example, the heat block 132. The insulative material 190 may comprise multi-layer insulation (comprising, for example, layers of at least one of polyimide, polyester, or aluminum), or a single thermal insulation material.

With continued reference to FIG. 2A, the hot end 115 may be operably coupled to the radiator 130 by fastening means 134. The fastening means 134 may comprise, for example, bolts, screws, or other fastening means. At least a portion of the fastening means 134 may extend through the heat block 132 and through at least a portion of the radiator 130. The fastening means 134 may operably couple the heat block 132 to the hot end 115 through the heat break 142 with, for example, nuts 136. In some embodiments, the fastening means 134 comprises bolts that extend through the heat block 132 and the radiator 130 and are secured with nuts 136.

The fastening means 134 and the nuts 136 may comprise, for example, titanium, stainless steel, steel having about 15 weight percent chromium and about 10 weight percent nickel, hafnium, an alloy of nickel including chromium and iron (e.g., Inconel), or another material. The fastening means 134 and nuts 136 may exhibit a thermal conductivity less than about 22 W/m-K at a temperature of about 25° C. In some embodiments, the fastening means 134 and the nuts 136 comprise titanium. Washers 138, which may comprise the same material composition as the fastening means 134 and the nuts 136 may be located between the fastening means 134 and a surface 139 of the heat block 132.

Thermal isolators 140 may thermally isolate the fastening means 134 from the heat block 132 within the apertures of the heat block 132. The thermal isolators 140 may extend through an entirety of the apertures of the heat block 132 to provide thermal isolation between the fastening means 134 and the heat block 132 and substantially prevent or reduce heat transfer from the heat block 132 to portions of the extrusion head 120 located above the heat block 132 (e.g., portions of the extrusion head 120 distal from the nozzle 112).

The thermal isolators 140 may comprise a material having a thermal conductivity less than about 0.300 W/m-K, such as less than about 0.288 W/m-K at a temperature of about 20° C. The thermal isolators 140 may comprise a thermoplastic material, such as, for example, polytetrafluoroethylene (PTFE) (Teflon™), a high pressure fiberglass fabric laminated with an epoxy resin (such as G-10, also referred to as phenolic G-10), a polyether imide (PEI) resin (such as Ultem™ 1010 commercially available from Sabic Innovative Plastics of Saudi Arabia), a polyamine-imide based plastic material (such as Torlon® commercially available from Solvay of Houston, Tex.), a polyimide-based plastic (such as Vespel commercially available from DuPont of Wilmington Del.), polymethylmethacrylate (PMMA), nylon, polyvinyl chloride (PVC), or another thermoplastic material. In some embodiments, the thermal isolators 140 comprise polytetrafluoroethylene.

Figure 2C:
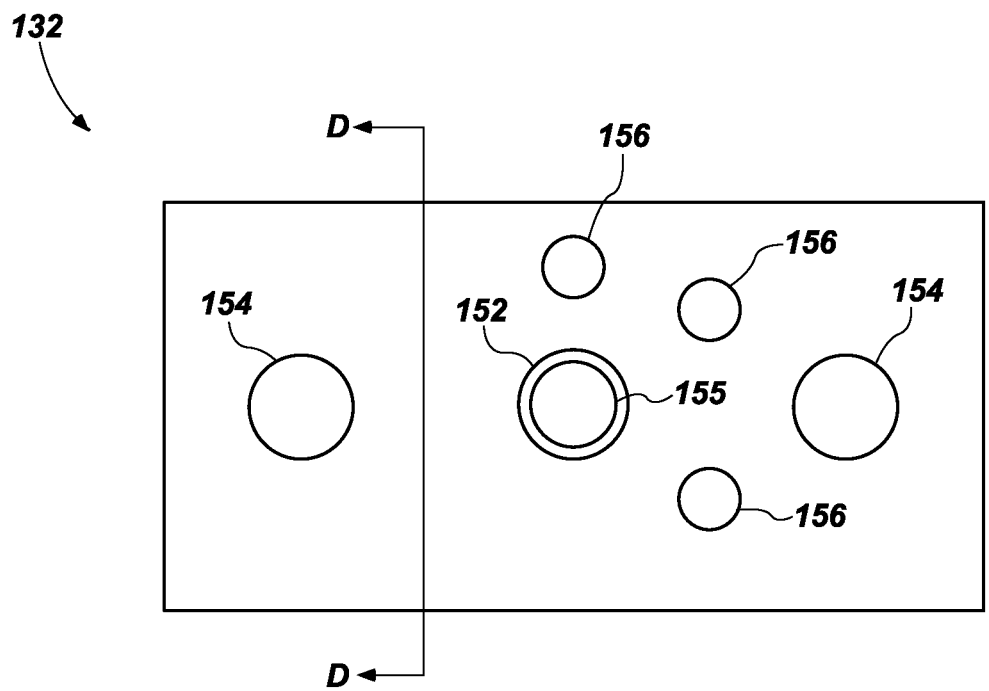
FIG. 2C is a simplified plan view of a heat block, in accordance with embodiments of the disclosure.
Figure 2D:
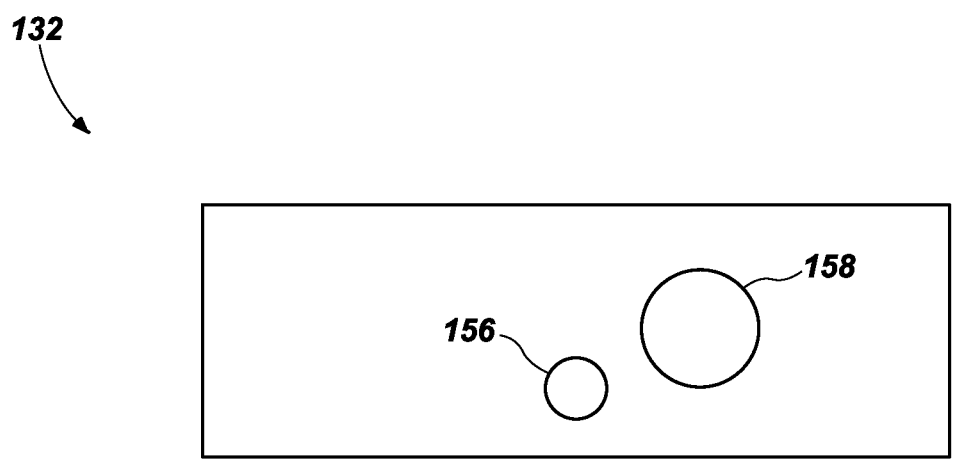
FIG. 2D is a simplified view of the heat block of FIG. 2C, taken through section line D-D of FIG. 2C.

FIG. 2C is a simplified plan view of the heat block 132 and FIG. 2D is a simplified view of the heat block 132 taken through section line D-D of FIG. 2C. The heat block 132 may include apertures 154 for receiving the fasteners 134 (FIG. 2A). The heat block 132 may further include an aperture 152 for receiving the nozzle 112 (FIG. 2A). Another aperture 155 having a diameter less than a diameter of the aperture 152 may be configured to receive the thermal liner 148 (FIG. 2A).

Additional apertures 156 for receiving various electronic equipment and sensors, for example, may be included within the heat block 132. By way of nonlimiting example, the additional apertures 156 may be configured to receive a thermocouple or a thermistor for measuring a temperature of the heat block 132. In some embodiments, one of the additional apertures 156 may include a thermocouple and another of the additional apertures 156 may include a thermistor.

The heat block 132 may include an aperture 158 for receiving a heating element. The heating element may comprise, for example, a heater cartridge comprising a ceramic heater cartridge. The heating element may heat the heat block 132 via resistive heating, for example. In turn, the heat block 132 may heat the feed material 106 (FIG. 1) as it passes through the head block 132 and to the nozzle 112.

The heat block 132 may comprise a material formulated and configured to transfer heat to the nozzle 112 (FIG. 2A) and the feed material 106 (FIG. 1) by, for example, conductive thermal transfer. The heat block 132 may heat the feed material 106 to a temperature suitable for flowing the feed material 106 through the nozzle 112. The heat block 132 may comprise one or more of aluminum, stainless steel, or another material. In some embodiments, the heat block 132 comprises aluminum.

The heat block 132 may be spaced from the radiator 130. For example, the surface 160 (FIG. 2A) of the heat block 132 may be spaced from an opposite surface of the radiator 130. Stated another way, a gap may separate the surface 160 of the heat block 132 from the opposing surface of the radiator 130. As will be described herein, the radiator 130 may be sized, shaped, and configured to remove heat from the heat block 132 and away from the extrusion head 120 such that heat from the heat block 132 does not substantially transfer (creep) to the feed apparatus 109 (FIG. 1) and the extruder 110 (FIG. 1) and heat the feed material 106 at locations between the surface 160 and the feed source (e.g., the spool 114). In some embodiments, heat from the heat block 132 is transferred to the radiator 130 through the heat break 142. Accordingly, the heat block 132 may be configured to provide heat to the feed material 106 at the hotend 115 while the radiator 130 may be configured to remove heat from the extrusion head 120 at locations distal from the hotend 115.

With reference again to FIG. 2A, the heat break 142 may be located between the heat block 132 and the teed apparatus 109 (FIG. 1) and may be configured to transfer heat from the heat block 132 to the radiator 130. The heat break 142 may share an interface 162 with the heat block 132 through which heat from the heat block 132 is transferred to the heat break 142. The heat break 142 may comprise a material exhibiting a thermal conductivity less than about 0.20 W/m-K. In some embodiments, the heat break 142 exhibits a lower thermal conductivity than other portions of the hotend 115 (FIG. 2A). The heat break 142 may exhibit an absolute thermal resistance equal to or greater than about 95.32 K/W, such as equal to or greater than about 95.5 K/W, equal to or greater than about 96.0 K/W, equal to greater than about 98 K/W, or equal to or greater than about 100 K/W.

The heat break 142 may comprise polytetrafluoroethylene (PTFE) (Teflon™), a polyether imide (PEI) resin (such as Ultem™1010 commercially available from Sabic Innovative Plastics of Saudi Arabia), a polyamine-imide based plastic material (such as Torlon® commercially available from Solvay of Houston, Tex.), a polyimide-based plastic (such as Vespel commercially available from DuPont of Wilmington Del.), polymethylmethacrylate (PMMA), nylon, polyvinyl chloride (PVC), or another thermoplastic material. In some embodiments, the heat break 142 comprises a polyimide-based plastic. In some embodiments, the heat break 142 comprises a different material than the thermal isolators 140.

Figure 2E:
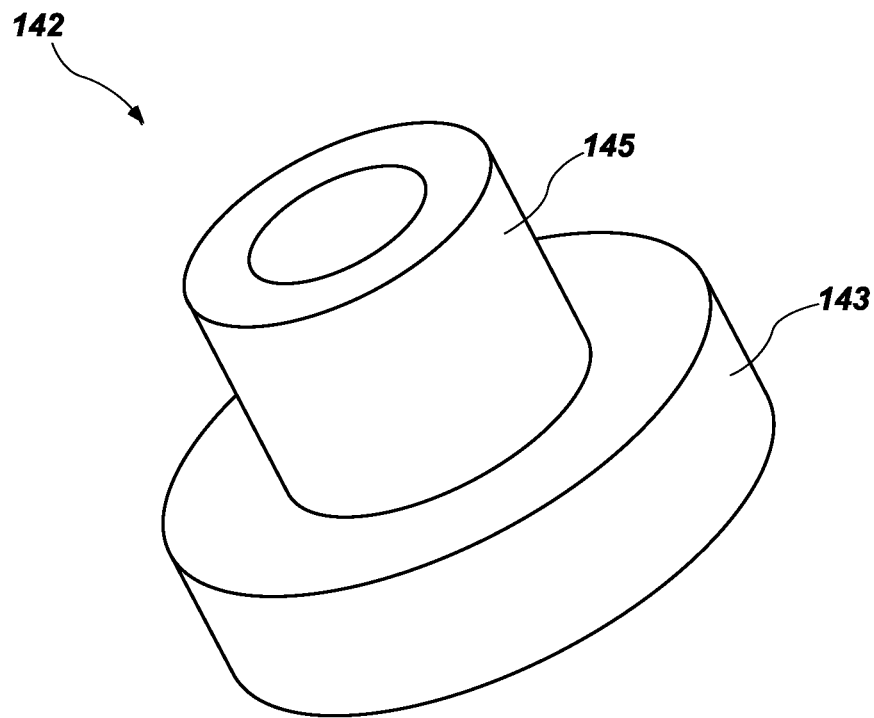
FIG. 2E is a simplified perspective view of a heat break, in accordance with embodiments of the disclosure.
Figure 2F:
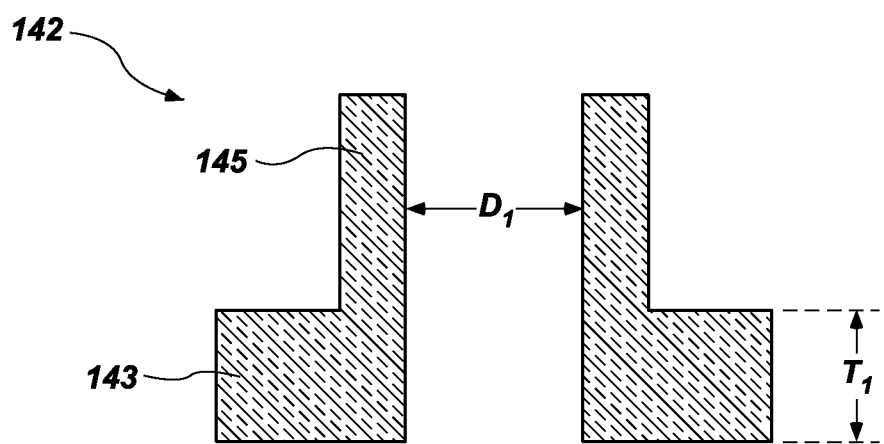
FIG. 2F is a simplified cross-sectional view of the heat break of FIG. 2E.

FIG. 2E is a simplified perspective view of the heat break 142 and FIG. 2F is a simplified cross-sectional view of the heat break 142. The heat break 142 may include a flange portion 143 configured to contact the heat block 132 (FIG. 2A) at the interface 162 (FIG. 2A). The flange portion 143 may be configured to thermally isolate the feed material 106 from the radiator 130 and to thermally isolate the heat block 132 from the feed material 106 located outside of the hotend 115 (e.g., the feed material 106 within the feed apparatus 109 (FIG. 1) and the extruder 110 (FIG. 1)).

The heat break 142 may further include a protruding portion 145 extending from the flange portion 143. With reference to FIG. 2A, the protruding portion 145 may be sized and shaped to interface with the first isolator 144 and the thermal spacer 150. The protruding portion 145 may thermally isolate the feed material 106 (FIG. 1) from the radiator 130 and the heat block 132.

Referring to FIG. 2F, a thickness $T_1$ (FIG. 2F) of the flange portion 143 may be within a range from about 1.588 mm (about 0.0625 inch) to about 4.763 mm (about 0.188 inch), such as from about 1.588 mm (about 0.0625 inch) to about 3.175 mm (about 0.125 inch), or from about 3.175 mm (about 0.125 inch) to about 4.763 mm (about 0.188 inch). In some embodiments, the thickness $T_1$ is about 3.175 mm (about 0.125 inch). However, the disclosure is not so limited and the thickness $T_1$ may be different than those described above.

The heat break 142 may include an inner diameter $D_1$, sized and shaped to receive the thermal liner 148 (FIG. 2A). The thermal liner 148 may comprise the same materials described above with reference to the thermal isolators 140. In Some embodiments, the thermal liner 148 comprises polytetrafluoroethylene.

The inner diameter $D_1$ may be within a range from about 5.08 mm (about 0.200 inch) to about 7.62 mm (about 0.300 inch), such as from about 5.08 mm (about 0.200 inch) to about 6.35 mm (about 0.250 inch), or from about 6.35 mm (about 0.250 inch) to about 7.62 mm (about 0.300 inch). However, the disclosure is not so limited and the inner diameter $D_1$ may be different than those described.

Figure 2G:
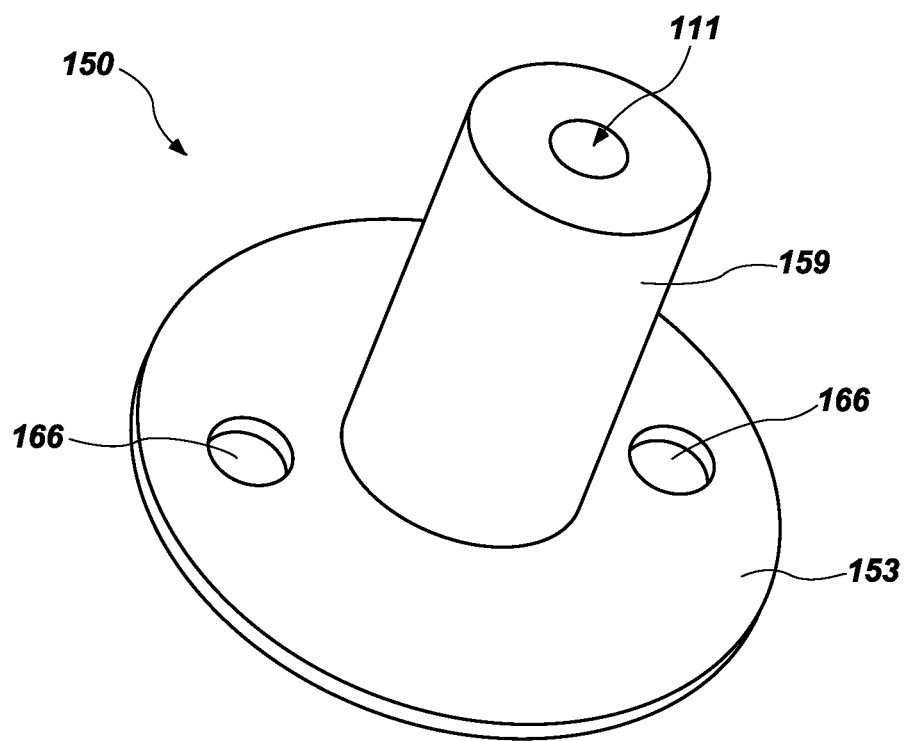
FIG. 2G is a simplified perspective view of a thermal spacer, in accordance with embodiments of the disclosure.
Figure 2H:
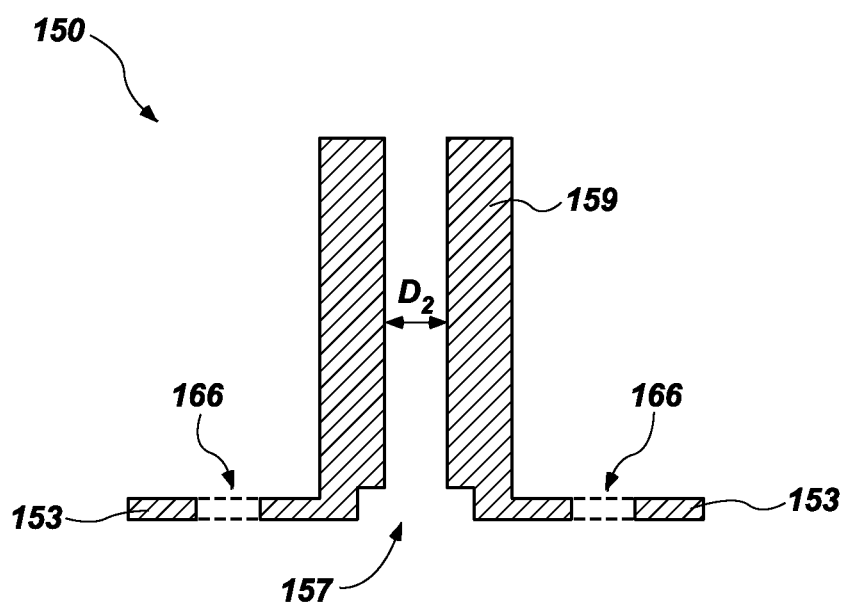
FIG. 2H is a simplified cross-sectional view of the thermal spacer of FIG. 2G.

FIG. 2G is a simplified perspective view of the thermal spacer 150 and FIG. 2H is a simplified cross-sectional view of the thermal spacer 150 of FIG. 2G, in accordance with embodiments of the disclosure. The thermal spacer 150 may include a flange portion 153. With reference to FIG. 2A, the flange portion 153 may interface with the first isolator 144 (FIG. 2A) and with the second isolator 146 (FIG. 2A). The flange portion 153 may be located between the first isolator 144 and the second isolator 146. Each of the first isolator 144, the second isolator 146, and the thermal spacer 150 may include apertures 166 (FIG. 2G, FIG. 2H, FIG. 2I, FIG. 2J, FIG. 3) for receiving the fastening means 134 (FIG. 2A) and the thermal isolators 140 (FIG. 2A).

The thermal spacer 150 may further include a protruding portion 159 extending from the flange portion 153. The protruding portion 159 may at least partially define the feed guide 111 for guiding the feed material 106 to the heat break 142 which, in turn, guides the feed material 106 to heat block 132 and the nozzle 112. Referring to FIG. 2H, the protruding portion 159 may include an inner diameter $D_2$ sized and shaped to receive the thermal liner 148 (FIG. 2A). In some embodiments, the inner diameter $D_2$ of the thermal spacer 150 is substantially the same as the inner diameter $D_1$ of the heat break 142.

The thermal spacer 150 may further include an opening 157 sized and shaped to receive and interface with at least a portion of the protruding portion 145 (FIG. 2E, FIG. 2F) of the heat break 142 (FIG. 2A). In some embodiments, the opening 157 has a larger diameter than the inner diameter $D_2$.

The thermal spacer 150 may comprise a material exhibiting a thermal conductivity less than or equal to about 15.0 W/m-K. By way of nonlimiting example, the thermal spacer 150 may comprise one or more of titanium, a polyether imide (PEI) resin (such as Ultem™ 1010 commercially available from Sabic Innovative Plastics of Saudi Arabia), a high pressure fiberglass fabric laminated with an epoxy resin (such as a material known as G-10, also referred to as phenolic G-10), an alloy of nickel including chromium and iron (e.g., Inconel), or another material. In some embodiments, the thermal spacer 150 comprises titanium. In some embodiments, the thermal spacer 150 exhibits a thermal conductivity greater than a thermal conductivity of the heat break 142, the thermal isolators 140, the first isolator 144, and the second isolator 146.

Figure 2I:
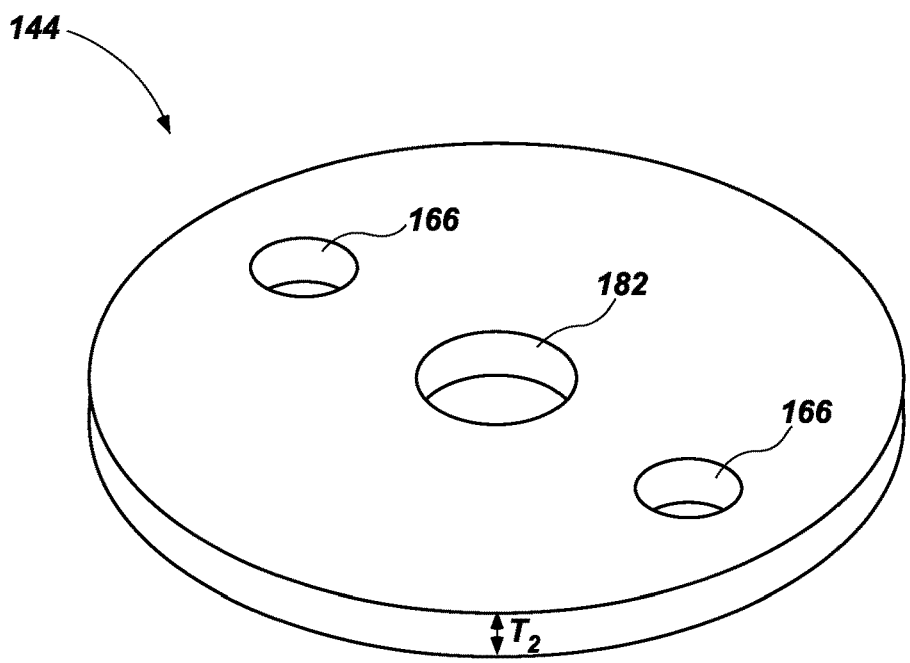
FIG. 2I is a simplified perspective view of a first isolator, in accordance with embodiments of the disclosure.
Figure 2J:
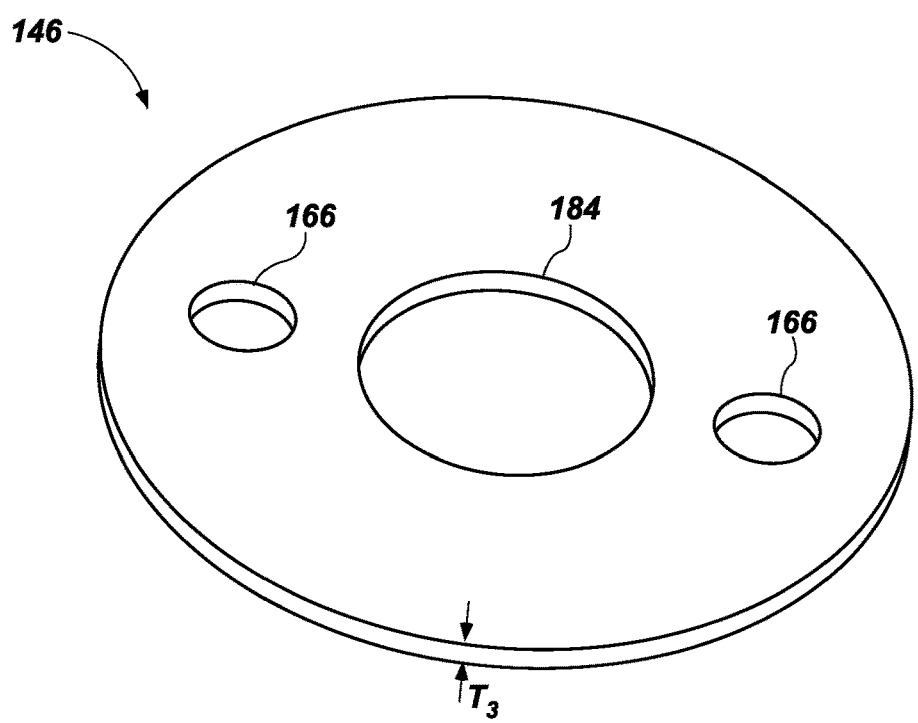
FIG. 2J is a simplified perspective view of a second isolator, in accordance with embodiments of the disclosure.

FIG. 2I is a simplified perspective view of the first isolator 144 and FIG. 2J is a simplified perspective view of the second isolator 146, in accordance with embodiments of the disclosure. With reference to FIG. 2I and FIG. 2J, the first isolator 144 and the second isolator 146 may include apertures 166 for receiving the fastening means 134 (FIG. 2A) and the thermal isolators 140 (FIG. 2A). The first isolator 144 may include an aperture 182 sized and shaped to receive the protruding portion 145 (FIG. 2E, FIG. 2F) of the heat break 142 (FIG. 2A). The second isolator 146 may include an aperture 184 sized and shaped to receive the protruding portion 159 (FIG. 2G, FIG. 2H) of the thermal spacer 150 (FIG. 2A).

The first isolator 144 may have a thickness $T_2$ greater than or equal to about 2.54 mm (about 0.100 inch), such as greater than about 3.175 mm (about 0.125 inch), 3.81 mm (about 0.150 inch), greater than about greater than about 4.445 mm (about 0.175 inch), or even greater than about 5.08 mm (about 0.200 inch).

The second isolator 146 may have a thickness $T_3$ greater than or equal to about 1.27 mm (about 0.050 inch), such as greater than about 2.54 mm (about 0.100 inch), greater than about 3.175 mm (about 0.125 inch), 3.81 mm (about 0.150 inch), greater than about greater than about 4.445 mm (about 0.175 inch), or even greater than about 5.08 mm (about 0.200 inch). In some embodiments, the thickness $T_3$ of the second isolator 146 is less than the thickness $T_2$ of the first isolator 144.

Each of the first isolator 144 and the second isolator 146 may independently comprise a material having a thermal conductivity less than about 0.30 W/m-K, such as less than about 0.288 W/m-K at a temperature of about 20° C. The first isolator 144 and the second isolator 146 may independently comprise a thermoplastic material, such as, for example, polytetrafluoroethylene (PTFE) (Teflon™), a high pressure fiberglass fabric laminated with an epoxy resin (such as a material known as G-10, also referred to as phenolic G-10), a polyether imide (PEI) resin (such as Ultem™ 1010 commercially available from Sabic Innovative Plastics of Saudi Arabia), a polyamine-imide based plastic material (such as Torlon® commercially available from Solvay of Houston, Tex.), a polyimide-based plastic (such as Vespel commercially available from DuPont of Wilmington Del.), polymethylmethacrylate (PMMA), nylon, polyvinyl chloride (PVC), or another thermoplastic material. In some embodiments, the first isolator 144 and the second isolator 146 comprise polytetrafluoroethylene. In some embodiments, the first isolator 144 and the second isolator 146 comprise the same material. In other embodiments, the first isolator 144 and the second isolator 146 comprise different materials.

Figure 2K:
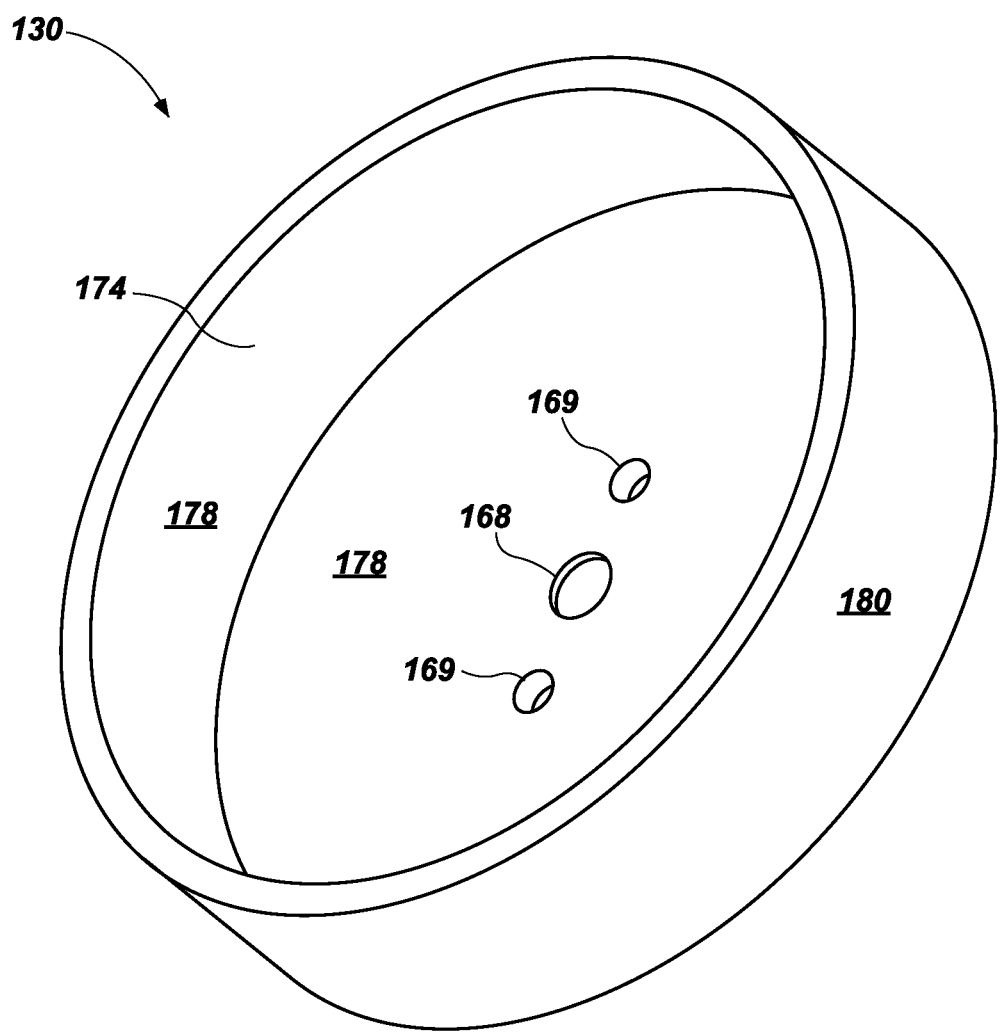
FIG. 2K is a simplified perspective view of a radiator, in accordance with embodiments of the disclosure.
Figure 2L:
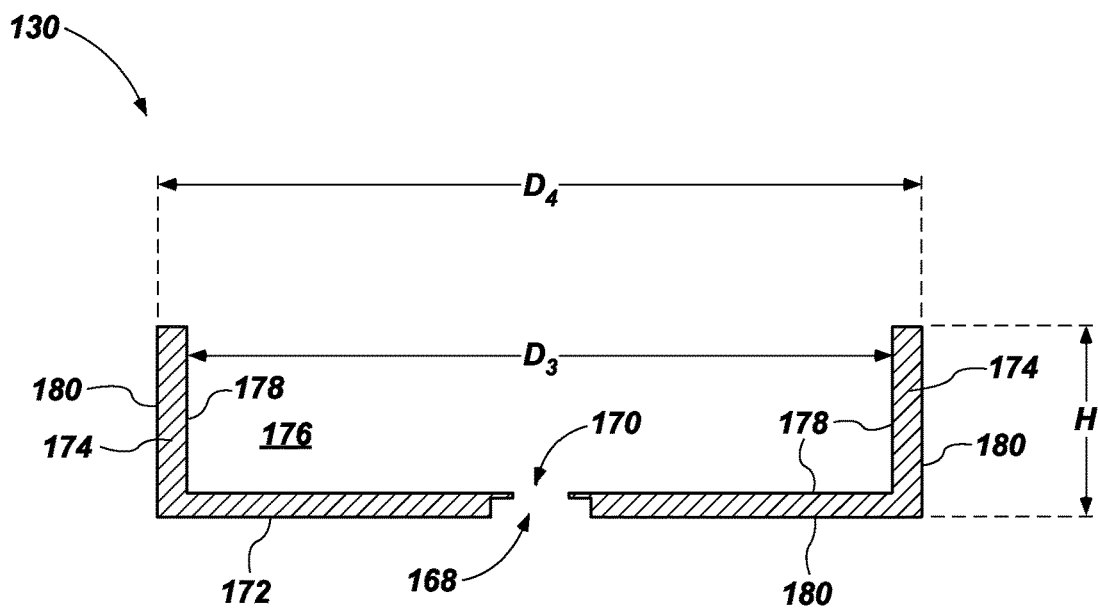
FIG. 2L is a simplified cross-sectional view of the radiator of FIG. 2K.
Figure 2M:
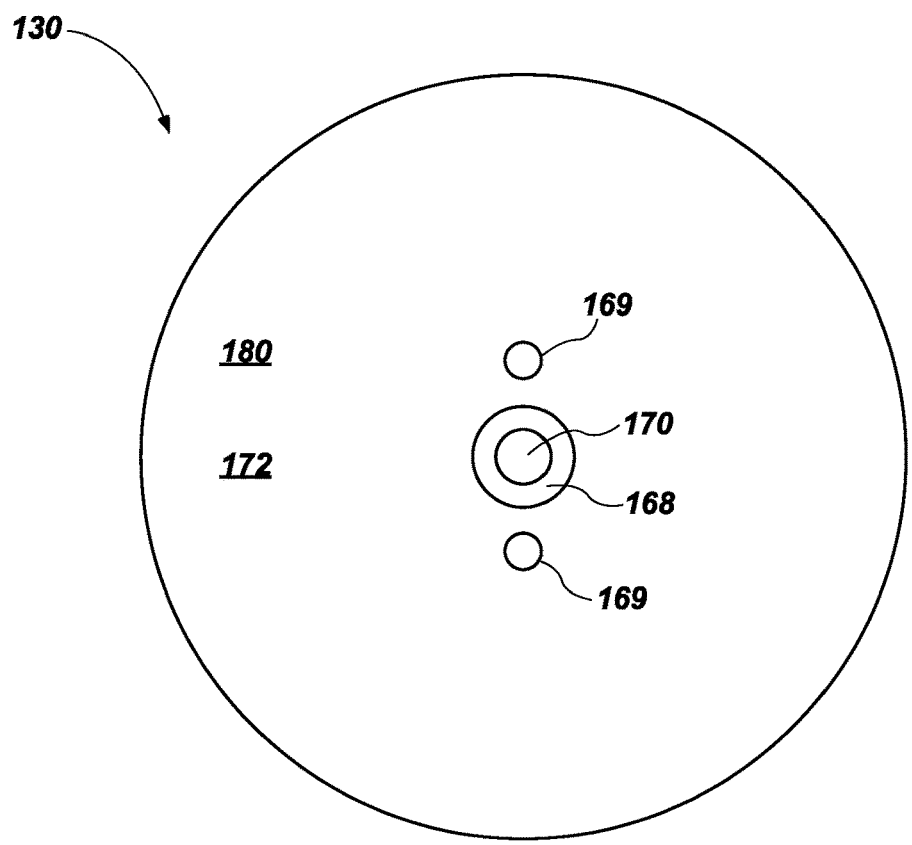
FIG. 2M is a simplified plan view of the radiator of FIG. 2K.

FIG. 2K is a simplified perspective view of the radiator 130, in accordance with embodiments of the disclosure. FIG. 2L is a simplified cross-sectional view of the radiator 130 of FIG. 2K, and FIG. 2M is a simplified plan view of the radiator 130 of FIG. 2K viewed from a side of the radiator 130 that couples with the nozzle 112 (FIG. 2A). The radiator 130 may comprise a material exhibiting a greater thermal conductivity than other portions extrusion head 120. In some embodiments, the radiator 130 comprises copper.

As described above, surfaces of the radiator 130 may be physically isolated (spaced) from surfaces of the heat block 132 (FIG. 2A). A protruding portion 174 of the radiator 130 may extend from the radially outward portions of an inner surface 178 in a direction away from the heat block 132 (FIG. 2A). In some embodiments, the inner surfaces 178 of the radiator 130 and the protruding portions 174 may define an open volume 176. In some such embodiments, the radiator 130 may resemble an open container (e.g., a container without a lid), for example. In some embodiments, the radiator 130 has a circular cross-sectional shape. In other embodiments, the radiator 130 has another cross-sectional shape, such as square, rectangular, triangular, pentagonal, hexagonal, or octagonal.

The radiator 130 may include an opening 168 which may be sized and shaped to receive the flange portion 143 (FIG. 2E, FIG. 2F) of the heat break 142 (FIG. 2A). The radiator 130 may further include another opening 170 which may be sized and shaped to receive the protruding portion 145 (FIG. 2E, FIG. 2F) of the heat break 142. Accordingly, the opening 168 may interface with the flange portion 143 of the heat break 142 and the another opening 170 may interface with at least a portion of the protruding portion 145 of the heat break 142. The radiator 130 may further include openings 169 configured to receive the thermal isolators 140 (FIG. 2A) and the fastening means 134 (FIG. 2A).

The radiator 130 may have an inner diameter $D_3$ within a range from about 38.1 mm (about 1.50 inch) to about 88.9 mm (about 3.50 inch), such as from about 38.1 mm (about 1.50 inch) to about 45 mm (about 1.77 inch), from about 45 mm (about 1.77 inch) to about 55 mm (about 2.17 inch), from about 55 mm (about 2.17 inch) to about 63.5 mm (about 2.50 inch), from about 63.5 mm (about 2.50 inch) to about 70 mm (about 2.76 inch), from about 70 mm (about 2.76 inch) to about 80 mm (about 3.15 inch), or from about 80 mm (about 3.15 inch) to about 88.9 mm (about 3.50 inch). In some embodiments, the inner diameter $D_3$ is greater than or equal to about 63.5 mm (about 2.50 inch).

In some embodiments, the inner diameter $D_3$ may be larger than a dimension of the heat block 132 (FIG. 2A). For example, with reference to FIG. 2A, the heat block 132 may have a length (in the left and right direction in the view of FIG. 2A) that is less than the inner diameter $D_3$ of the radiator 130.

An outer diameter $D_4$ of the radiator 130 may be within a range from about 76.2 mm (about 3.00 inch) to about 127 mm (about 5.00 inch), such as from about 76.2 mm (about 3.00 inch) to about 90 mm (about 3.54 inch), from about 90 mm (about 3.54 inch) to about 96.5 mm (about 3.80 inch), from about 96.5 mm (about 3.80 inch) to about 100 mm (about 3.94 inch), from about 100 mm (about 3.94 inch) to about 110 mm (about 4.33 inch), from about 110 mm (about 4.33 inch) to about 120 mm (about 4.72 inch), or from about 120 mm (about 4.72 inch) to about 127 mm (about 5.00 inch). In some embodiments, the outer diameter $D_4$ is greater than or equal to about 96.5 mm (about 3.80 inch).

A height H of the radiator 130 may be within a range from about 10.2 mm (about 0.400 inch) to about 25.4 mm (about 1.00 inch), such as from about 10.2 mm (about 0.400 inch) to about 15.4 mm (about 0.600 inch), from about 15.4 mm (about 0.600 inch) to about 20.3 mm (about 0.800 inch), or from about 20.3 mm about (0.800 inch) to about 25.4 mm (about 1.00 inch). In some embodiments, the height H is greater than or equal to about 15.4 mm (about 0.600 inch).

The outer diameter $D_4$ and the height H of the radiator 130 may at least partially define an exposed surface area of the radiator 130. An amount of radiative thermal transfer from the radiator 130 may be at least partially proportional to the exposed surface area of the radiator 130. Accordingly, in some embodiments, the outer diameter $D_4$ and the height H are selected such that the radiator 130 exhibits a desired rate of thermal transfer by thermal radiation.

In some embodiments, a ratio of a temperature of the heat block 132 (FIG. 2A) to a surface area of the outer surfaces 180 of the radiator 130 may be greater than or equal to about 4.855° C./in², such as greater than or equal to about 4.9° C./in², greater than or equal to about 5.0° C./in², greater than or equal to about 6.0° C./in², greater than or equal to about 8.0, or even greater than or equal to about 10.0° C./in².

In some embodiments, one or more portions of the extrusion head 120 (FIG. 2A) may include a coating formulated and configured to exhibit desired thermal transfer properties via thermal radiation. For example, one or more of inner surfaces 178 of the radiator 130 (e.g., surfaces of the radiator defining the inner diameter $D_3$), outer surfaces 180 of the radiator 130 (e.g., surface of the radiator defining the outer diameter $D_4$), surfaces of the thermal spacer 150 (FIG. 2A), and surfaces of the heat block 132 (FIG. 2A) may be coated with one or more materials to impart desired thermal conductivity properties on the respective portion of the extrusion head 120.

In some embodiments, the inner surfaces 178 of the radiator 130 may be coated to increase the thermal radiation (e.g., an emissivity) of the inner surfaces 178. The inner surfaces 178 may be coated with, for example, black paint, aluminum including a chromate coating (e.g., iridate aluminum, an alloy including chromium and aluminum), nickel, another material, or one or more such materials or coatings. In some embodiment, the inner surfaces 178 of the radiator 130 comprise copper. In some embodiments, the inner surfaces 178 of the radiator 130 are coated with black paint.

The inner surfaces 178 may exhibit a ratio of absorptivity ($\alpha$) to emissivity ($\epsilon$) (i.e., $\alpha/\epsilon$) greater than or equal to about 1.000, such as greater than about 1.000, greater than about 1.002, greater than about 1.040, or greater than about 1.050. In some embodiments, the ratio of the absorptivity to the emissivity is within a range from about 0.950 to about 1.050, such as from about 0.950 to about 0.907, from about 0.970 to about 0.990, from about 0.990 to about 1.010, from about 1.010 to about 1.030, or from about 1.030 to about 1.050. In some embodiments, the ratio of the absorptivity to the emissivity is greater than or equal to about 1.000.

The outer surfaces 180 of the radiator 130 may be coated with a material to increase heat transfer from the outer surfaces 180 to an external environment by radiative heat transfer. The coating may increase an emissivity of the outer surfaces 180. The coating on the outer surfaces 180 may include, for example, one or more of black paint, white paint, an optical solar reflector (e.g., a material including a layer of quartz adjacent a reflective layer of metal), silvered polytetrafluoroethylene (e.g., polytetrafluoroethylene coated with silver), or another material. In some embodiments, the coating on the outer surfaces 180 comprises black paint or white paint.

The outer surfaces 180 may exhibit a ratio of absorptivity to emissivity ($\alpha/\epsilon$) less than or equal to about 1.059, such as less than or equal to about 1.050, less than or equal to about 1.040, less than or equal to about 1.020, less than about 1.000, less than about 0.980, less than about 0.960, or less than about 0.950. In some embodiments, the ratio of the absorptivity to the emissivity is within a range from about 0.950 to about 1.100, such as from about 0.950 to about 0.960, from about 0.960 to about 0.980, from about 0.980 to about 1.000, from about 1.000 to about 1.020, from about 1.020 to about 1.040, from about 1.040 to about 1.060, from about 1.060 to about 1.080, or from about 1.080 to about 1.100. In some embodiments, the ratio of the absorptivity to the emissivity of the outer surfaces 180 is less than or equal to about 1.059. In some embodiments, the ratio of the absorptivity to the emissivity of the outer surfaces 180 is greater than the ratio of the absorptivity to the emissivity of the inner surfaces 178. In other embodiments, the ratio of the absorptivity to the emissivity of the outer surfaces 180 is less than the ratio of the absorptivity to the emissivity of the inner surfaces 178.

The thermal spacer 150 (FIG. 2G, FIG. 2H) may exhibit a ratio of absorptivity to emissivity ($\alpha/\epsilon$) less than about 1.059, such as less than about 1.050, less than about 1.040, less than about 1.020, or even less than about 1.000. In some embodiments, the ratio of the absorptivity to the emissivity is within a range from about 1.000 to about 1.060, such as from about 1.000 to about 1.020, from about 1.020 to about 1.040, or from about 1.040 to about 1.060. In some embodiments, the ratio of the absorptivity to the emissivity of the thermal spacer 150 is about 1.059. In some embodiments, the coating on the thermal spacer 150 may comprise one or more of black paint, white paint, an optical solar reflector, silvered polytetrafluoroethylene (e.g., polytetrafluoroethylene coated with silver, also referred to as "silvered Teflon®"), or another material. In some embodiments, the thermal spacer 150 may be coated with the same material as the outer surfaces 180 of the radiator 130. In some embodiments, heat may be transferred via thermal radiation from the exposed surfaces of the thermal spacer 150 to an external environment and from the surfaces (e.g., the outer surface 180) of the radiator 130 to the external environment. In some embodiments, the ratio of the absorptivity to the emissivity of the thermal spacer 150 may be equal to about the ratio of the absorptivity to the emissivity of the outer surfaces 180 of the radiator 130. In other embodiments, the ratio of the absorptivity to the emissivity of the thermal spacer 150 is less than the ratio of the absorptivity to the emissivity of the outer surfaces 180 of the radiator 130.

Surfaces 160 (FIG. 2A) of the heat block 132 (FIG. 2A) facing the radiator 130 may be coated with a coating comprising, for example, at least one of black paint, aluminum including a chromate coating (e.g., iridate aluminum, an alloy including chromium and aluminum), nickel, or another material. Such surfaces may exhibit a ratio of absorptivity to emissivity greater than about 1.000, such as greater than about 1.020, greater than about 1.040, or greater than about 1.050. In some embodiments, the ratio of the absorptivity to the emissivity is within a range from about 0.950 to about 1.050, such as from about 0.950 to about 0.970, from about 0.970 to about 0.990, from about 0.990 to about 1.010, from about 1.010 to about 1.030, or from about 1.030 to about 1.050. In some embodiments, the surface of the heat block 132 facing the radiator 130 may have a ratio of absorptivity to emissivity of greater than or equal to about 1.000.

Surfaces of the heat block 132 (FIG. 2A) that face away from the radiator 130 (i.e., surfaces of the heat block 132 other than the surface 160 (FIG. 2A)) may be coated with for example, at least one of black paint, white paint, an optical solar reflector, silvered polytetrafluoroethylene (e.g., polytetrafluoroethylene coated with silver), or another material. A ratio of absorptivity to emissivity of the surface of the heat block 132 facing away from the radiator 130 may be less than about 1.059, such as less than about 1.050, less than about 1.040, less than about 1.020, or less than about 1.000. In some embodiments, the ratio of the absorptivity to the emissivity is within a range from about 1.000 to about 1.060, such as from about 1.000 to about 1.020, from about 1.020 to about 1.040, or form about 1.040 to about 1.060. In some embodiments, the ratio of the absorptivity to the emissivity of such surfaces of the heat block 132 is less than or equal to about 1.059.

In some embodiments, the tool 100 (FIG. 1) may be configured to exhibit a temperature drop greater than about 100° C. between the surface 160 (FIG. 2A) and a distance of about 6.35 mm (about 0.250 inch) from the interface in a direction toward the heat break 142 (FIG. 2A) (i.e., in the upward direction in the view of FIG. 2A). In some embodiments, the temperature drop over such distance may be greater than about 110° C., greater than about 120° C., greater than about 130° C., greater than about 140° C., or even greater than about 150° C.

FIG. 3 is an exploded view of the extrusion head 120. The extrusion head 120 may include the nozzle 112 that may be coupled to the hot end 115. The radiator 130 may be coupled to the hot end 115 with fastening means 134 and the nuts 136. The heat break 142 may be located adjacent to the heat block 132 and may include a surface that is coplanar with a surface of the heat block 132. The protruding portion 145 of the heat break 142 may interface with the first isolator and the thermal spacer 150. The first isolator 144 may be located adjacent to the radiator 130 and the heat break 142. The flange portion 153 of the thermal spacer 150 may be located adjacent to the first isolator 144 and between the first isolator 144 and the second isolator 146. The protruding portion 159 of the thermal spacer 150 may be configured to interface with the extruder 110 (FIG. 1).

The tool 100 (FIG. 1) may be configured to form one or more articles in low pressure environments (e.g., in a vacuum), such as in outer space. In some embodiments, the tool 100 may be configured to form articles in zero gravity, microgravity environments, or other environments. However, the disclosure is not so limited, and the tool 100 may be configured to form articles in other environments, such as under atmospheric conditions or under high pressure conditions. Articles that may be formed with the tool 100 may include, for example, components for satellite structures (e.g., satellite frame structures, a truss structure, etc.), components for aerospace structures (e.g., space shuttles, rockets, satellites, missiles, etc.), components for aircraft structures (e.g., airplanes, helicopters, etc.), components for military vehicle structures, or for other structures. In some embodiments, the tool 100 may be used to repair or fabricate replacement parts for one or more existing structures located in a microgravity environment (such as outer space). In some embodiments, the tool 100 or the hotend 115 (FIG. 2A) may be incorporated onto a robot arm of an additive manufacturing tool. Such an additive manufacturing tool may include a plurality of robot arms, each including a hotend 115, at least some of which may be configured to receive a different feed material than at least another of the hotends 115.

Accordingly, an additive manufacturing tool may be configured to additively manufacture one or more articles without a convective heat transfer mechanism, such as a fan. The additive manufacturing tool may be configured to additively manufacture the one or more articles in space, for example. A radiator may be operably coupled to a heat block of the additive manufacturing tool. The radiator may be configured to transfer heat from the heat block via conduction and may be further configured to conduct heat from the radiator to an external environment by radiative thermal transfer. The radiator may remove heat from the hotend without air cooling and without liquid cooing, which often require significant amounts of power and are prone to failure. By way of comparison, the radiator removes heat passively by thermal radiation and does not require external power or moving parts.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. An apparatus for additively manufacturing an article, the apparatus comprising:
   a thermal spacer defining a feed guide to receive a feed material;
   a heat block to heat the feed material;
   a nozzle configured to receive the feed material in operable communication with the heat block; and
   a radiator configured to transfer heat from the heat block to an external environment by thermal radiation, the radiator having inner surfaces defining an inner dimension of the radiator, the inner dimension of the radiator larger than a largest dimension of the heat block, the inner surfaces of the radiator and an outer diameter of the thermal spacer defining an open volume between the inner surfaces of the radiator and the outer diameter of the thermal spacer.

2. The apparatus of claim 1, wherein the radiator comprises copper.

3. The apparatus of claim 1, wherein the radiator has a circular cross-sectional shape.

4. The apparatus of claim 1, wherein the radiator is located on a side of the heat block opposite the nozzle.

5. The apparatus of claim 1, further comprising a heat break adjacent the radiator and the heat block, the heat break extending through a surface of the heat block to an opposite surface of the heat block, the heat break comprising a different material than the heat block.

6. The apparatus of claim 5, wherein the heat break comprises a thermoplastic material.

7. The apparatus of claim 5, wherein the heat break thermally isolates the heat block from a feed source.

8. The apparatus of claim 5, wherein the heat block is spaced from the radiator by the heat break.

9. The apparatus of claim 1, wherein outer surfaces of the radiator are coated with one or more of black paint, white paint, an optical solar reflector, or silvered polytetrafluoroethylene.

10. The apparatus of claim 1, further comprising a thermally insulative material surrounding the heat block.

11. The apparatus of claim 1, wherein the radiator has a greater thermal conductivity than other portions of the apparatus.

12. The apparatus of claim 1, further comprising fastening means extending through the heat block, the radiator, and the thermal spacer.

13. The apparatus of claim 12, wherein the fastening means comprise titanium.

14. The apparatus of claim 12, further comprising a thermoplastic material between the fastening means and the heat block.

15. The apparatus of claim 1, further comprising a heat break adjacent to the heat block and a thermal insulator comprising titanium adjacent to the heat break.

16. The apparatus of claim 1, wherein a ratio of an absorptivity to an emissivity of at least some surfaces of the radiator is greater than or equal to about 1.059:1.000.

17. The apparatus of claim 1, further comprising a controller in operable communication with the nozzle.

18. The apparatus of claim 1, further comprising an extruder in operable communication with the heat block.

19. The apparatus of claim 18, wherein the extruder comprises at least one roller configured to extrude the feed material from a spool.

20. The apparatus of claim 1, wherein surfaces of an outer diameter of the radiator exhibit a ratio of an absorptivity to an emissivity less than a ratio of an absorptivity to an emissivity of the inner surfaces of the radiator.

21. The apparatus of claim 1, further comprising a heat break between the heat block and the radiator, the heat break exhibiting a thermal conductivity less than about 0.20 W/m-K.

22. The apparatus of claim 1, further comprising:
- a thermal liner on an inner diameter of the thermal spacer; and
- a heat break in contact with the heat block, the radiator, the thermal spacer, and the thermal liner.

23. A tool for additively manufacturing a material in a vacuum, the tool comprising:
- an extrusion head configured to be in operable communication with a feed material, the extrusion head comprising:
  - a thermal spacer defining a feed guide to receive the feed material;
  - a nozzle configured to receive the feed material from the thermal spacer;
  - a heat block coupled to the nozzle;
  - a heat break coupled to the heat block; and
  - a radiator adjacent to the heat break and spaced from the heat block by the heat break, the radiator having inner surfaces defining an inner dimension of the radiator, the inner dimension of the radiator larger than a largest dimension of the heat block, the inner surfaces of the radiator and an outer diameter of the thermal spacer defining an open volume between the inner surfaces of the radiator and outer diameter of the thermal spacer.

24. The tool of claim 23, wherein the radiator comprises copper.

25. The tool of claim 23, wherein surfaces of the radiator are spaced from surfaces of the heat break by a gap.

26. The tool of claim 23, wherein the heat break comprises polyimide.

27. The tool of claim 23, wherein surfaces of the radiator defining the inner dimension of the radiator exhibit a ratio of an absorptivity to an emissivity greater than or equal to about 1.000:1.000.

* * * * *

UNITED STATES PATENT AND TRADEMARK OFFICE
CERTIFICATE OF CORRECTION

PATENT NO. : 11,376,788 B2
APPLICATION NO. : 16/575952
DATED : July 5, 2022
INVENTOR(S) : Thomas A. Cote et al.

It is certified that error appears in the above-identified patent and that said Letters Patent is hereby corrected as shown below:

In the Specification

| | | |
|---|---|---|
| Column 5, | Line 16, | change "teed" to --feed-- |
| Column 7, | Line 34, | change "teed" to --feed-- |
| Column 8, | Line 43, | change "teed" to --feed-- |
| Column 8, | Line 66, | change "teed" to --feed-- |
| Column 9, | Line 23, | change "102. (FIG. 1)" to --102 (FIG. 1)-- |
| Column 11, | Line 10, | change "teed" to --feed-- |
| Column 11, | Line 27, | change "Ultem™1010" to --Ultem™ 1010-- |
| Column 12, | Line 2, | change "In Some" to --In some-- |

Signed and Sealed this
Twenty-first Day of February, 2023

*Katherine Kelly Vidal*

Katherine Kelly Vidal
*Director of the United States Patent and Trademark Office*